United States Patent
Bean et al.

(10) Patent No.: US 6,460,023 B1
(45) Date of Patent: Oct. 1, 2002

(54) SOFTWARE AUTHORIZATION SYSTEM AND METHOD

(75) Inventors: Richard Bean, Cupertino; Young Harvill, San Mateo, both of CA (US)

(73) Assignee: Pulse Entertainment, Inc., San Francisco, CA (US)

( * ) Notice: Subject to any disclaimer, the term of this patent is extended or adjusted under 35 U.S.C. 154(b) by 0 days.

(21) Appl. No.: 09/334,436

(22) Filed: Jun. 16, 1999

(51) Int. Cl.[7] .................................................. G06F 7/04
(52) U.S. Cl. ............................ 705/54; 705/51; 705/52; 705/53; 705/57; 705/58; 705/59; 717/11
(58) Field of Search .............................. 705/51, 52, 53, 705/54, 26, 27, 57, 58; 380/278, 279, 281, 284; 717/11; 713/156, 168, 172, 183, 185, 189, 191

(56) References Cited

U.S. PATENT DOCUMENTS

| | | | | |
|---|---|---|---|---|
| 5,319,705 A | * | 6/1994 | Halter et al. | 705/54 |
| 5,440,631 A | * | 8/1995 | Akiyama et al. | 705/53 |
| 5,509,070 A | | 4/1996 | Schull | |
| 5,636,277 A | * | 6/1997 | Nagahama | 705/59 |
| 5,727,215 A | * | 3/1998 | Rynaski et al. | 717/11 |
| 5,864,620 A | * | 1/1999 | Pettitt | 705/54 |
| 6,005,935 A | * | 12/1999 | Civanlar | 705/51 |
| 6,049,671 A | * | 4/2000 | Silvka et al. | 707/11 |

FOREIGN PATENT DOCUMENTS

| | | | |
|---|---|---|---|
| EP | 0844550 A2 | * | 5/1998 |
| WO | WO9825373 | * | 6/1998 |
| WO | WO9845768 | * | 10/1998 |

OTHER PUBLICATIONS

"InstallShield Software Corporation Partners With VeriSign Inc. Provide Secure Electronic Softwqre Distribution"; Oct. 1998; Business Wire, p1350; Dialog file 16, Accession No. 05901189.*

Roberts; Momentum builds for digital IDs—Verisign, others press forward on identity verification; Oct. 1996; WebWeek, v2 n16 p24; Dialog file 233, Accession No. 00439068.*

"Installshield software corporation: InstallShield partners with VeriSign Inc" Oct. 1998; M2 Presswire; Dialog file 20, Accession No. 03234571.*

* cited by examiner

Primary Examiner—Tariq R. Hafiz
Assistant Examiner—Romain Jeanty
(74) Attorney, Agent, or Firm—Gary Cary Ware & Freidnerich LLP (57) ABSTRACT

A system add method for controlling the execution or display to one or more pieces of software developed using the developer's software is provided. The system permits the developer to receive revenue for use of the software without inconveniencing the customer or the user. In more detail, the system has a customer site with one or more locations containing one or more assets wherein a master key is purchased by the customer from the developer that specifies the one or more locations on the site of the customer where the software is located. The master key is stored at a particular location on the site of the customer and each asset contains a content key that identifies the location of the master key. The system further includes a user computer that determines if the execution or display of the asset downloaded from the customer's site is authorized by the developer. To determine the authorization of an asset, the asset is downloaded from the customer's site, the location of the master key based on the content key in the asset is determined, the master key is downloaded from the determined location on the customer's site and the locations contained in the master key are compared to the location of the asset to determine if the asset is accessible by the user computer.

29 Claims, 6 Drawing Sheets

SOFTWARE AUTHORIZATION SYSTEM AND METHOD

BACKGROUND OF THE INVENTION

This invention relates generally to a system and method for controlling the access and use of a piece of software and in particular to a system and method for metering the access and downloading of a piece of software or content from a site.

For a developer of software, it is desirable to be able to track the usage of the software by users and customers in order to prevent piracy and ensure that the developer receives the licensing fee for the use of the software. In this description, the term "software" may refer to both software applications and content files, such as three dimensional animation files, video files, sound files and the like. It is especially hard to track the use of a piece of content since the content may be easily moved from one computer to another computer. The problem of trying to reduce piracy and to ensure the developer receives the appropriate compensation for use of the software is exacerbated by the World Wide Web (the Web) in which it is very easy to access a Web site and download a piece of software or content file.

In the past, developers required a person who purchased the software to attach a hardware dongle (a piece of hardware connected to a computer with a particular hardwired key inside it) to the computer so that only that computer is able to access the software. In particular, whenever the software is executed by the user, the software checked to determine if a hardware dongle is connected to the computer and to determine whether the key within the hardware dongle is correct. After the software confirmed that the hardware dongle with the correct key is attached to the computer, the software permit the user to use the software. The conventional hardware dongle does limit the use of the software, but is very cumbersome and annoying to the user. The hardware dongle requires the software developer to purchase the dongle and then either absorb the cost of the dongle or pass it on to the client so that it is most often used for more expensive software. In addition, the client may find the hardware dongle a major inconvenience since it makes it difficult to transfer the software to another computer if needed. The hardware dongle does work well for a single computer executing the software, but is less suited to a Web-based system in which the user of the computer may be downloading a piece of software from a Web site.

Another conventional software access limiter system involves forcing the user to go to an authorized Web site each time the user wanted a new piece of software. For example, a developer may sell a piece of software to a customer. The customer may want to display various content developed by the customer using the developer's piece of software. The developer wants to limit the display of that content in order to receive a license fee for its display. With this system, each time that a user wanted to view a particular piece of content, such as a three dimensional animation character, the user would be required to go to the developer's authorized Web site/server and enter a password in order to download and then view the content. This system is a major inconvenience for the user since the user does not want to have to go to a completely different Web site and enter a password in order to download the new content. This system may discourage a user from using the software.

Another conventional system involves a piece of security software resident on the server of the customer who creates the content or software. The security software meters the access to the content or software on the customer's site created using the developer's software. This system requires that the developer is permitted to install a piece of security software on the server of the customer. This system is therefore a major inconvenience to the customer as well as a security risk. In summary, the above systems do not permit the developer to receive his compensation for use of the software or content without becoming a major inconvenience to either the user or the third party. Thus, it is desirable to provide a software authorization system and method which avoids the above problems and limitations of the conventional systems and it is to this end that the present invention is directed.

SUMMARY OF THE INVENTION

The software authorization system and method in accordance with the invention permits a developer to provide licensed software or content files to a customer where the license revenues to the developer increase as the scale of the customer's site expands because the authorization system is easily scaleable. The system may also permit license-free content to be displayed in a way that encourages customers to purchase a license. The system is transparent to the user of the customer's site so that the user is not inconvenienced. The customer also does not need to store an executable software application on the customer's site. The system also does not require a piece of hardware, such as a hardware dongle. The system also eliminates the need for the developer's site to be involved in any authorization transactions. The license granted by the system may be limited to a predetermined number or locations of the copies, such of a predetermined number of Web pages or a predetermined number of Uniform Resource Locators (URL's). The license granted using the system may also be time-limited. The system also ensures that an author of a software or content file is identified and that the file cannot be accessed without the author's permission.

In more detail, a developer may be paid a license fee by the customer so that a customer may display or execute the developer's software or content on the customer's Web site. The ability to display or execute the software or content is limited to a predetermined number of locations, such as Web pages, within a site, such as the Web site, of the customer. For example, the customer may pay for the right to display or execute the software or content on 10 Web pages which permits the customer to store the licensed software or content on ten different Web pages on the customer's site. To specify the locations of the licensed software or content, the customer may enter the addresses of the locations (e.g., the URL's of the Web pages) into a master key provided by the developer. The customer may update the master key at any time to increase the number of authorized locations. When a user downloads the licensed software or content from the customer's site, the software executing on the user's computer (known as the Player) may also download the master key and compare the master key to the downloaded licensed software or content file. Based on the comparison, the player application in the user's computer determines whether or not the software or content may be executed or displayed.

Thus, in accordance with the invention, a system for controlling the execution of a piece of software developed by a developer on a site of the customer is provided. The system comprises a customer site comprising one or more locations containing one or more pieces of software of the developer, a master key purchased by the customer that specifies the one or more locations on the site of the customer where the software is located wherein the master key is stored at a particular location on the site of the customer. Each piece of software of the developer contains a content key that identifies location of the master key. The system further comprises a user computer comprising means for determining if the execution of the piece of software downloaded from the customer's site is authorized by the developer wherein the determining means comprises means for downloading the piece of software from the customer's site, means for determining the location of the master key based on the content key in the piece of software, means for downloading the master key from the determined location and means for comparing the locations contained in the master key to the location of the piece of software to determine if the piece of software is accessible by the user computer.

DETAILED DESCRIPTION OF PREFERRED EMBODIMENT

The invention is particularly applicable to a Web-based content file/rich media asset authorization system and method and it is in this context that the invention will be described. It will be appreciated, however, that the system and method in accordance with the invention has greater utility, such as to other types of software files. The system may also be implemented using a variety of different communications mediums and systems.

Figure 1:
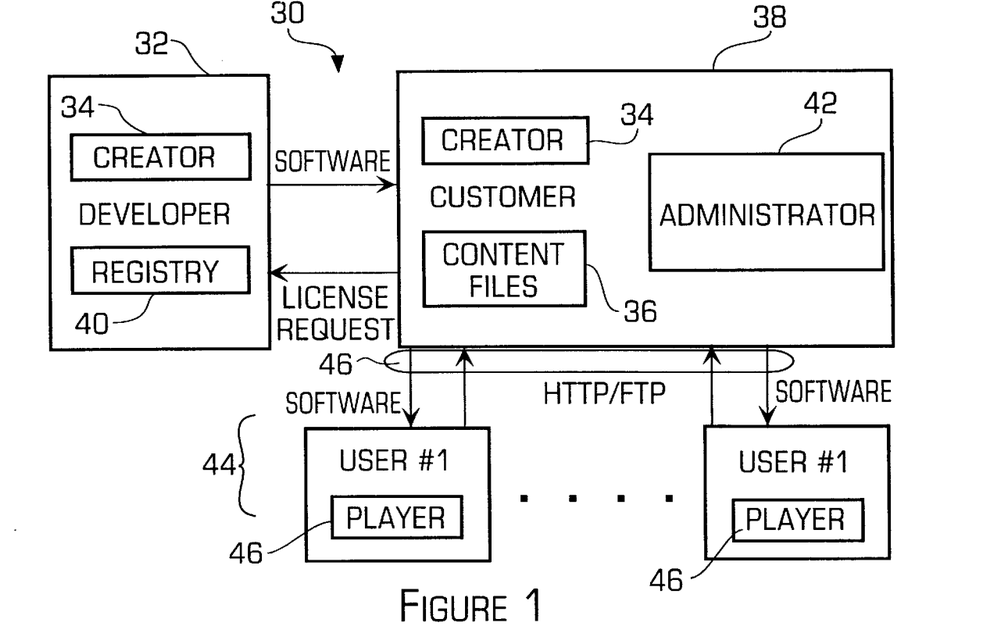
FIG. 1 is a block diagram illustrating a software authorization system in accordance with the invention.

FIG. 1 is a block diagram illustrating a software authorization system 30 in accordance with the invention. The system may include a developer's site 32 that may be a Web server containing pieces of software that may be used by a customer to generate/store various software or content. For example, the pieces of software may include software tools, such as a creator 34, which permits a customer (also referred to as an author herein) to create one or more content files 36 (also known as rich media assets) on a customer site 38. The content files may be, for example, a file containing media data which may be stored on a Web server 38 and then displayed to users of customer's Web server when the content file is downloaded to a user's computer. The developer's site 32 may also include a registry 40 that permits the developer to track the licenses provided to the one or more customers as described below in more detail. The developer's site 32 may communicate the various pieces of software, such as the creator 34, to the customer's site 38 after the customer has executed an appropriate license agreement. In the example shown, the software may be the creator 34.

When the customer executes a license agreement, the customer may specify a location on the site where a master key in accordance with the invention may be stored so that each content file created by the creator 34 may be directed to that location to locate the master key. The location of the master key may be known as the master key uniform resource locator (URL). The customer operating the customer's site may use the creator 34 to create the one or more content files 36. As each content file is created on the customer site having a particular master key, the creator 34 may embed a content key in the content file that specifies the location of the master key URL that may then be used for authorization purposes as described below. The customer's site 38 may also include an administrator 42 which controls the access to the content files in accordance with the invention. In a preferred embodiment, the administrator may be embedded within the creator 34. As described below in more detail, the customer may order a master key with a predetermined number of authorized Web pages or domain names so that the created content files may be stored on the authorized Web pages or domain names. The authorized content files may then be downloaded to the users of the customer's site. In accordance with the invention, only content files embedded in the authorized Web pages or domain names may be displayed or executed on the users' computers.

One or more users 44 (User #1–User #N) may access to the customer's site 38 by a communications network 46, such as the Internet or the World Wide Web, so that each user may access the content files embedded in the Web pages of the customer's site and download the content files. Each user computer may communicate with the customer's site using a well known communications protocol, such as the hypertext transfer protocol (HTTP) or the file transfer protocol (FTP). Once the user has downloaded the content files, the user may execute or display the content files using another piece of software. For example, the user may download a free software application 46, known as a player software application, which interprets the content files and displays a three dimensional animated character on the user's computer provided that the customer is authorized to distribute the content files. If the content file has not been authorized, the user may see an error message or may see the content with a watermark which identifies the content file as being free and not authorized. Once the content file becomes authorized, the watermark may disappear so that the user may view the content without the watermark. Now, an example of the creator application in accordance with the invention will be described.

Figure 2:
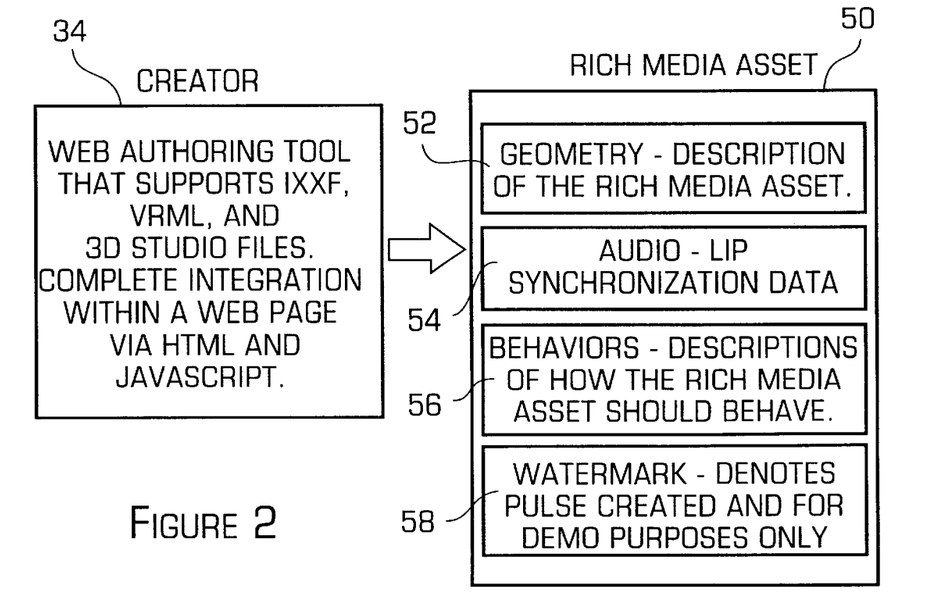
FIG. 2 is a block diagram illustrating an example of the customer's creation tool in accordance with the invention.

FIG. 2 is a block diagram illustrating an example of the customer's creation tool 34 in accordance with the invention that may be used by the customer to generate authorized content files. In this example, the creator 34 may be provided free to the customer by the developer and may permit the customer to develop and create content files. In more detail, the creator 34 may be a Web authoring tool that is executed by the CPU of the customer's computer, that supports various output formats (DXF, VRML and 3D Studio files) and that generates a rich media asset 50. In a preferred embodiment, the creator 34 may be completely integrated with a Web page using hypertext markup language (HTML) and JavaScripts. In this example, the rich media asset may be a content file containing information about a three dimensional animated character which may be animated on a user's computer. The rich media asset in this example may include a geometry portion 52, an audio portion 54, a behavior portion 56 and a watermark portion 58. The geometry portion 52 may contain a geometrical description of the three dimensional animated character and the audio portion 54 may contain audio track data which may be synchronized to the movement of the three dimensional animated character. The behavior portion 56 may contain information about the movements and actions of the three dimensional animated character and the watermark portion 58 may contain the watermark which is displayed with the three dimensional animated character file unless the rich media asset is downloaded from an authorized Web page or domain name. Now, an example of the authorization system will be described.

Figure 3:
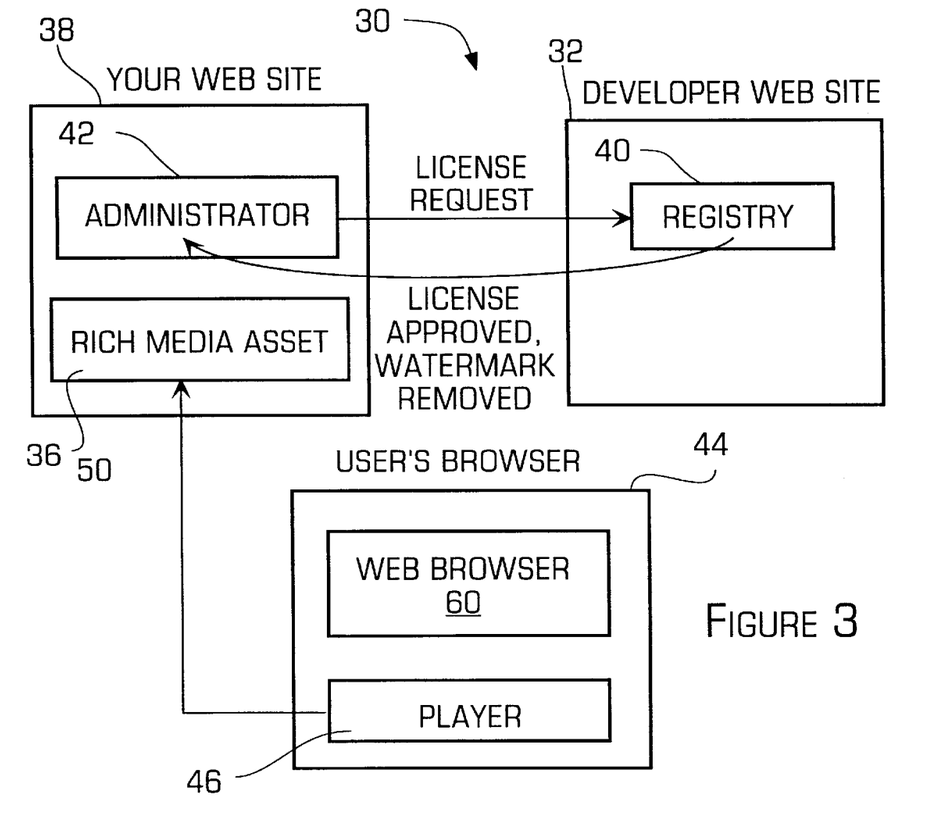
FIG. 3 is a block diagram illustrating an example of the software authorization in accordance with the invention.

FIG. 3 is a block diagram illustrating an example of the software authorization system 30 in accordance with the invention. As described above, the developer's site 32, the customer's site 38 and the user's computer 44 are shown connected to each other. The developer's site 32 may include the registry 40 which receives license requests from the customer and generates the master keys for customers (including the location of the master key on the customer's site). In particular, each customer may register to use the rich media assets it generates using the creator application on one or more URL addresses (Web pages) within a domain name by executing the licensing agreement and agreeing to pay the license fees. The master key generated by the registry may be received by the administrator 42 on the customer's site 38. As the customer generates rich media assets using the creator 34, the customer, using the administrator 42, may plug the URL addresses where Web pages that embed the rich media assets are located into the master key to generate a Web master key. The customer's site 38 may also store the free player software application 46 which may be used by user's computers 44 to display the rich media asset. If the master key matches the content key stored in the rich media asset, then the watermark is not shown to the user otherwise the user views the watermark that indicates that the rich media asset is not properly licensed and that obstructs the display of the rich media asset or views an error message.

The user's computer 44 may include the player application 46 downloaded from the customer's site and a browser application 60 from communicating with the customer's site. The browser application may be any typical browser application. In a preferred embodiment, the player application may be a plug-in to the browser application. When the user downloads a rich media asset from the customer, the player application determines if the rich media asset is authorized and either displays the watermark or an error message if the rich media asset is not authorized or display the rich media asset if it is authorized as described below in more detail. Now, several examples of customer sites with authorized content/software will be described.

Figure 4:
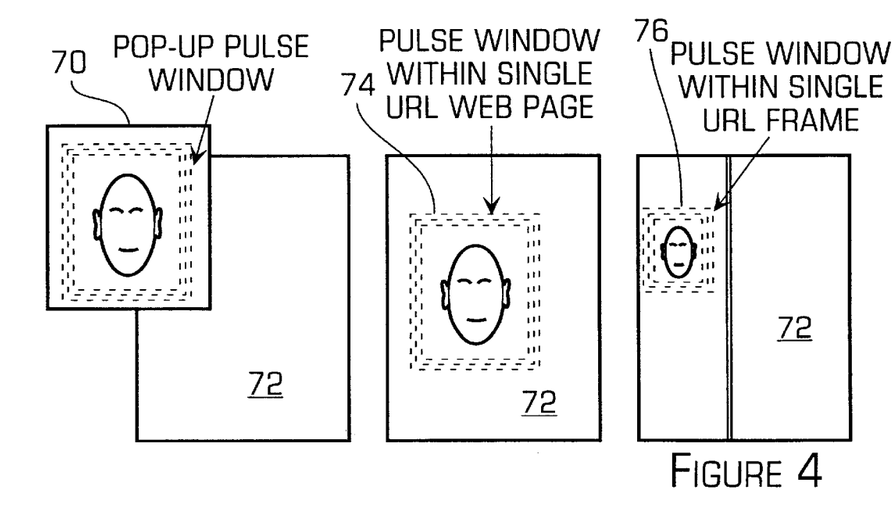
FIG. 4 illustrates an example of the software/content authorization in accordance with the invention.

FIG. 4 illustrates an example of the software/content on a customer's site in accordance with the invention. In this example, the rich media asset may be licensed to a unique domain name (as specified by the customer) which permits changing content to be contained on a predetermined number of Web pages (addressed by unique URL's). The content in this example may include animated talking spokesman for a product, digital guides and animated on-line personalities. In this example, the content may be displayed in a pop-up window 70 which pops up in front of a Web page window 72, in a window 74 within the Web page 72 or in a window within a frame 76 of the Web page 72. Each of the windows 70, 74, 76 may be counted as a single authorized use of the content so that the example has three authorized uses. Now, another example of a customer site with authorized content will be described.

Figure 5:
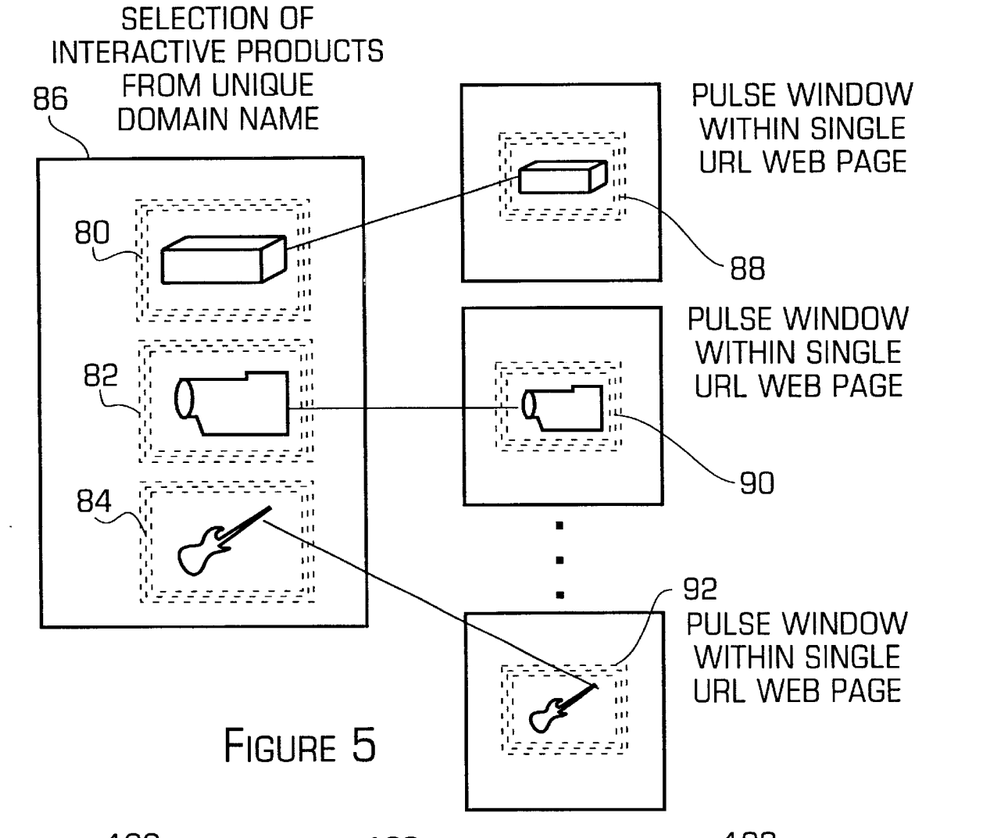
FIG. 5 illustrates another example of the software/content authorization in accordance with the invention.

FIG. 5 illustrates another example of the software/content authorization in accordance with the invention. In this example, one or more links 80–84 to the licensed content may be contained in a domain name page 86 with a unique URL. In particular, the page 86 may contain a selection of products wherein each product may be animated using a rich media asset. The links 80–84 on the page 86 may transfer the user to one or more separate Web pages 88, 90, 92 which contain the animated product selected by the user. In this example, the rich media asset may include interactive, animated products that demonstrate themselves, interactive advertising or original content syndicated from a single source. Now, another example of a customer's site with authorized content will be described.

Figure 6:
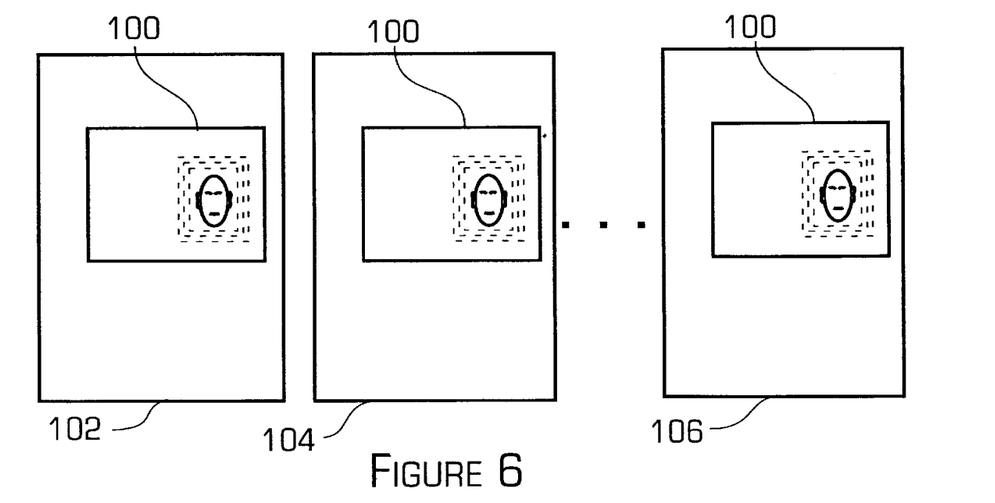
FIG. 6 illustrates another example of the software/content authorization in accordance with the invention.

FIG. 6 illustrates another example of the software/content authorization in accordance with the invention wherein a similar or identical rich media asset 100 may be displayed on one or more different domain names or URL's 102, 104, 106. For example, the same content may be syndicated to a predetermined number of unique domain names or URL's. An example of the content may be a interstitial banner advertisement which may be displayed on a plurality of different Web pages. Each URL or domain name may be an authorized use of the content file. Now, an example of the master key in accordance with the invention will be described.

Figure 7:
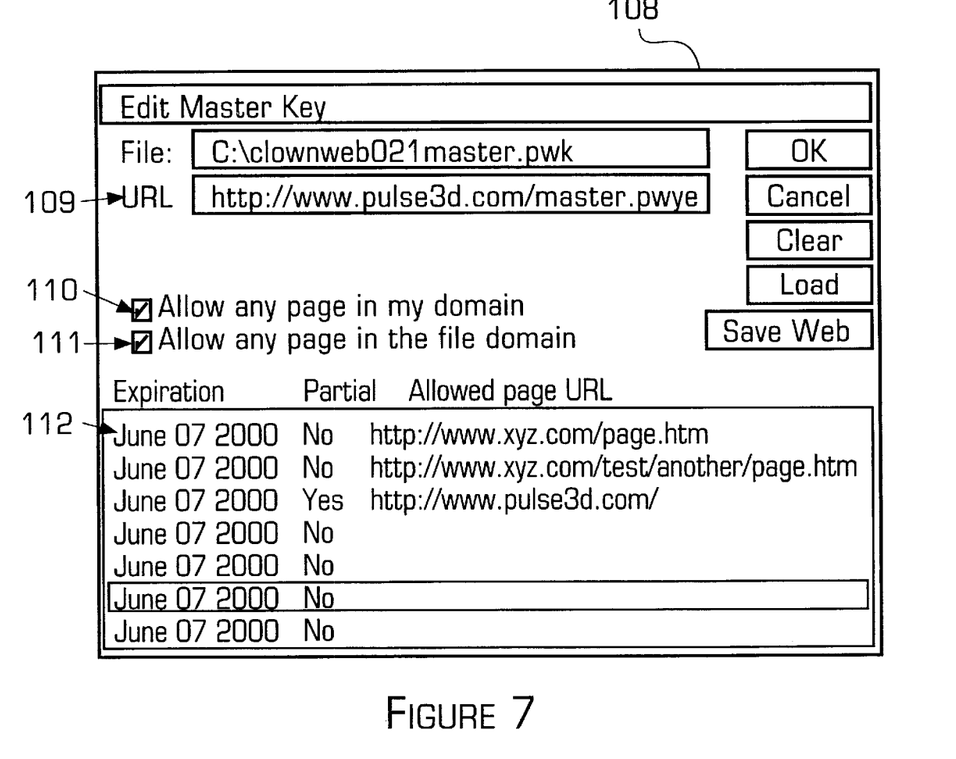
FIG. 7 is a diagram illustrating a master key in accordance with the invention.

FIG. 7 is a diagram illustrating an example of a screen for modifying a master key 108 in accordance with the invention which permits the developer to receive its compensation for execution or display of the content files downloaded from the customer's site. The master key is very dynamic so that it can be used for a variety of different licensing schemes. The master key contains data specified by the developer at the time of purchase of the license (that cannot be modified by the customer because it is encrypted) and data that is modifiable by the customer in order to authorize specific Web pages, URL addresses and domain names. The screen permits a master key Web URL 109 to be specified by the developer based on information provided to the developer by the customer. The master key Web URL may not be modified by the customer. Once the master key Web URL is specified in the master key, all content files created using the creator application on the customer's computer will contain a content key which contains the master key Web URL so that the player may determine if the content is authorized. A checkbox 110 permits the customer to specify that content files within the same domain as the master key may be displayed even if the actual URL's do not appear on the authorized Web page list in the master key. These content files will be displayed with a watermark indicating they were not explicitly authorized.

A second checkbox 111 permits the customer to specify that the player application may display the content file from any Web page if the content file is in the player's file system domain (e.g., the URL starts with "file://"). These check boxes are provided as a convenience for the customer to take advantage of during the development and testing of the content before they know the intended URL's. They are not part of the normal use for production assets.

A listing 112, that may be modified by the customer, permits the customer to specify the URL's that contain authorized content files as a list of Web page authorization slots. The number of Web page authorization slots and the expiration date for each slot is determined by the developer based on the type of license paid for by the customer. For example, a typical purchase option may be to buy 10 slots that are each good for one year from the purchase date (Jun. 7, 2000 in this example since the master key was purchased on Jun. 7, 1999), but any other purchase option is also possible. The customer may then fill in the URL's with the content files into the list. Each URL identifies a Web (HTML) page that is authorized to display the content files that are linked to this master key by the content key. In this example, the customer has specified two URL's with authorized content files. In the third slot shown in FIG. 7, the customer has specified a partial feature (only if the partial feature is purchased by the customer) that authorizes any Web pages in the domain (http://www.pulse3d.com/ in this example) to be authorized to contain a content file. The master key thus permits the developer to provide one or more different licensing options to a customer which may be specified using the encrypted master key. Now, a method for generating an authorized rich media asset in accordance with the invention will be described.

Figure 8:
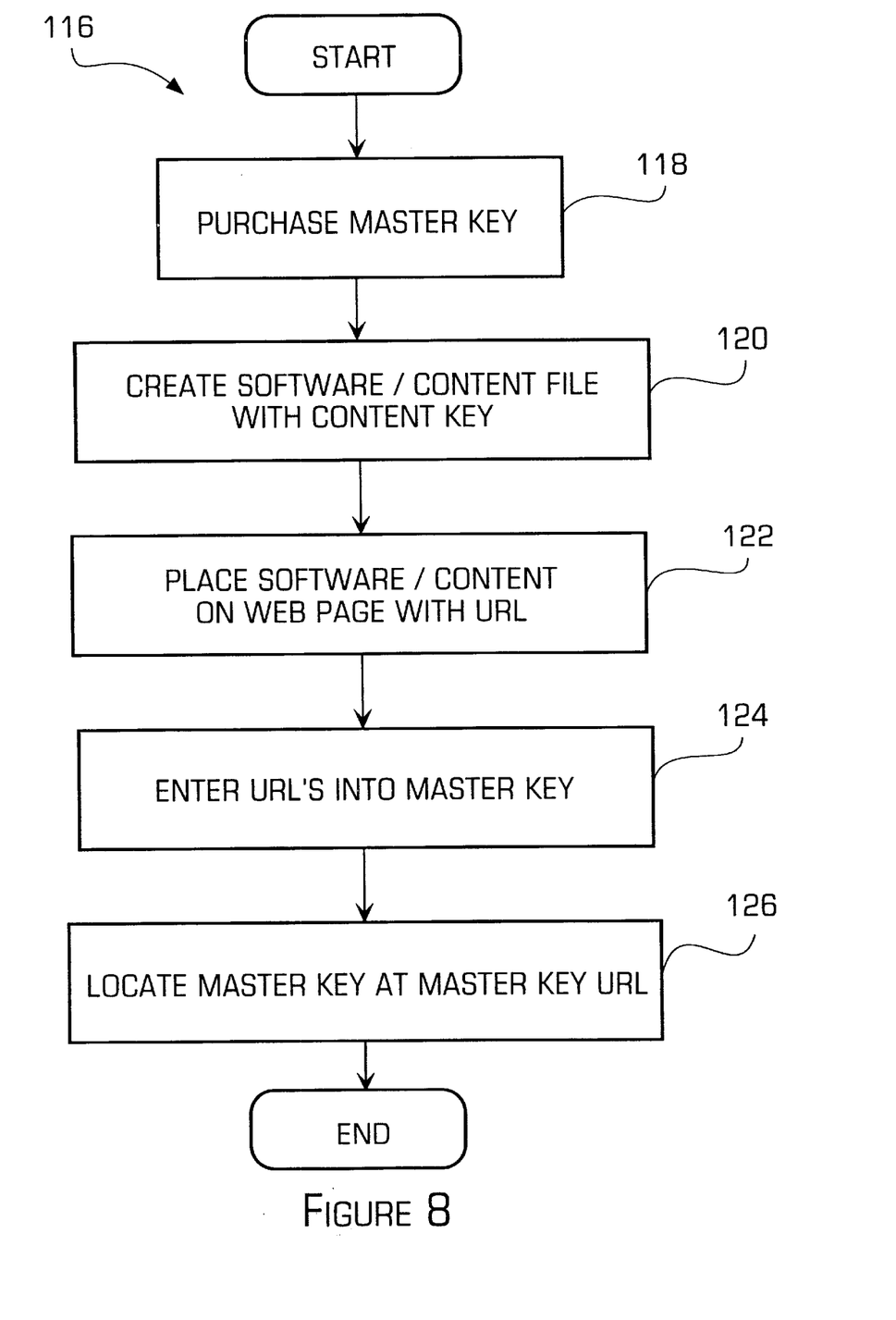
FIG. 8 is a flowchart illustrating a method for creating authorized software/content files in accordance with the invention.

FIG. 8 is a flowchart illustrating a method 116 for creating authorized software/content files in accordance with the invention. In step 118, the customer may purchase a master key from the developer which permits a predetermined number of different URL's to store the rich media asset. The actual number of URL's authorized by the master key may be adjusted depending on the licensing fee paid by the customer. For example, the customer may buy a master key that authorizes 10 URL's or a master key that authorized 100 URL's. Thus, the master key may be easily scaled to accommodate the growth of the customer. To purchase the master key, the customer provides the developer with the license fee, a customer identifier, a master key URL and an executed license agreement. The master key URL is the location on the customer's Web server where the master key is located. The master key delivered to the customer may be an encrypted file that identifies the customer identifier, the master key URL and the number of authorized Web pages along with their expiration dates, and whether the customer has purchased the partial URL option.

In step 120, the customer may develop rich media assets using the developer's free creator software application. The creator software application may generate a content file containing the rich media asset along with a content key which identifies the master key URL. The content key may also contain information identifying and crediting the author of the rich media asset. The content files generated by the creator may be encrypted so that the content key cannot be changed by the customer or any other party. In step 122, the customer may place/store each rich media asset on a particular Web page that has a unique URL and that will invoke the player plug-in in the user's computer to display the rich media asset. Next, the customer may enter the URL's of the Web pages which contain the rich media assets into the master key using the administrator application in step 124. The URL's specified in the master key now have authorized rich media assets. The administrator may convert the master key with the URL's into a master Web key. The customer may then place the master Web key on the Web server at the location identified by the master key URL previously specified in the original purchase of the master key) in step 126 The rich media assets contained on the URL's identified in the master Web key are now authorized rich media assets so that, when the user attempts to view the rich media assets on those Web pages, the user sees the rich media asset and not an error message or a watermark. Now, a method for a user to display the content/software created using the developer's software will be described.

Figure 9:
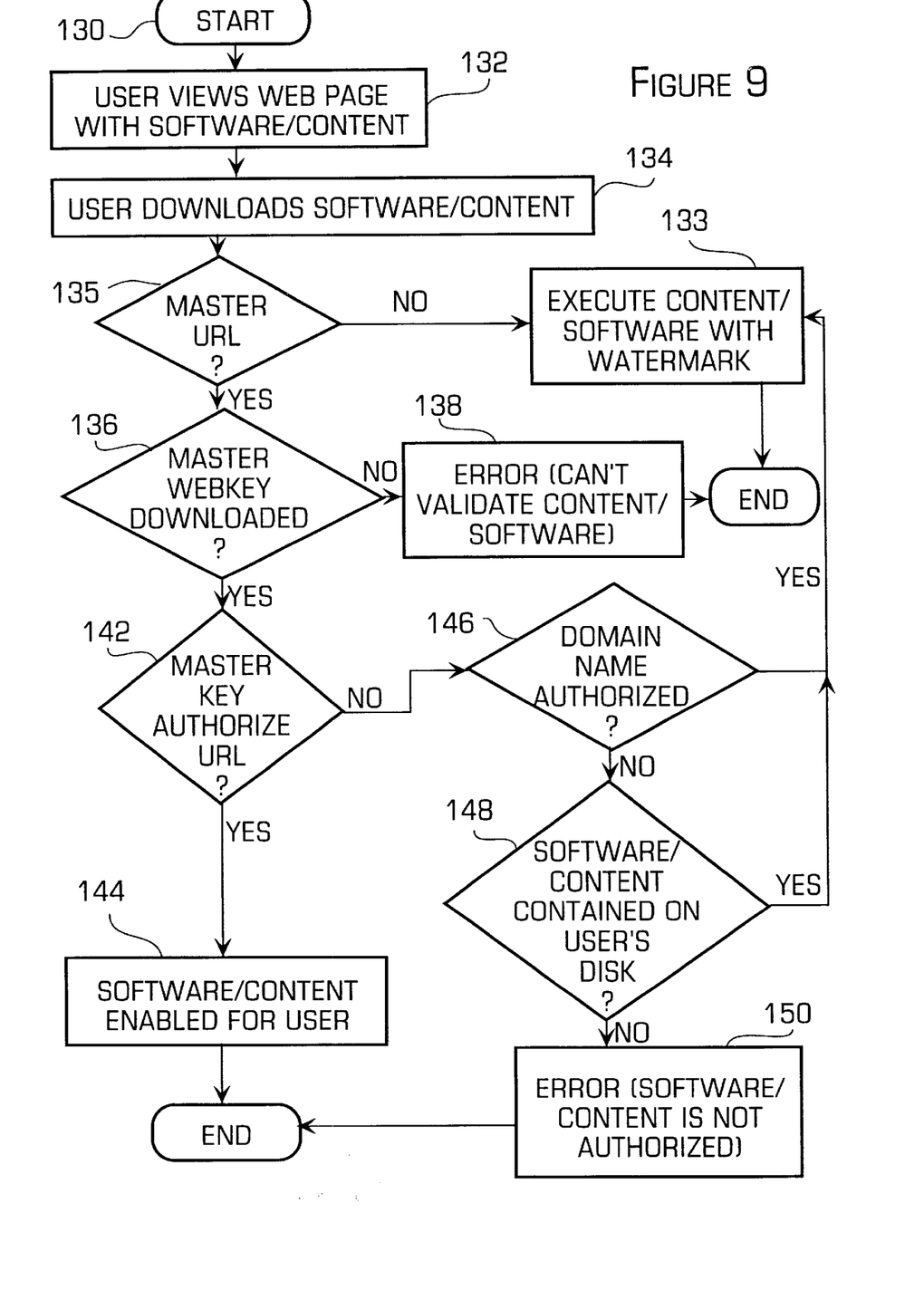
FIG. 9 is a flowchart illustrating a method for executing the authorized software/content files in accordance with the invention.

FIG. 9 is a flowchart illustrating a method 130 for executing the authorized software/content files in accordance with the invention. This method assumes that the user already has downloaded the player application necessary to view the content or software. If the user has not previously used the player application, it may be downloaded free from the customer's site and plugged into the user's browser application. In step 132, the user may view the customer's Web page (using the URL) which contains software or content created by the developer's software. In step 134, the user may download the software or content from the Web page using a well known transfer protocol, such as the hypertext transfer protocol (HTTP) to a location locatable by the player plug-in. After the software or content is downloaded, the player plug-in may review the content key in the downloaded content or software and determine if a master URL is present in step 135. If the master URL is not present, then the player plug-in may execute or display the downloaded content/software with a watermark indicating that the content/software was created without a license. If the master URL is present in the content key, the player plug-in may attempt to download the master Web key and determine if the master Web key is successfully downloaded in step 136.

The player plug-in may display an error message to the user in step 138 if the master key was not found indicating that the downloaded content/software cannot be validated. If the master key was properly downloaded, then the player plug-in may determine if the master key authorizes the URL of the Web page containing downloaded software or content in step 142. If the URL is authorized by the master key, the player plug-in displays or executes the software or content in step 144. If the content/software is not from an authorized Web site, the player plugin may determine if the domain of the site is authorized in step 148. If the domain name is authorized, the player plug-in may play/execute the software/content with a watermark in step 133. If the domain is not authorized, the player plug-in may determine if the downloaded content/software being executed/displayed is already resident on the user's persistent storage in step 148 and may display/execute the software content with the watermark in step 133. If the software/content is not already on the persistent storage device of the user, the player plug-in may generate an error message in step 150 indicating that the downloaded software/content is not authorized and therefore may not be displayed or executed by the user. This method may be repeated each time a user wishes to display or execute software or content controlled by the software authorization system in accordance with the invention.

In summary, user access to the content or software developed by the developer's software in accordance with the invention is controlled by the comparison of the content key in the software or content created by the customer using the developer's software and the master key of the customer. Thus, the system and method permits the developer to control access to the content or software created by the developer's software without a hardware dongle or a piece of software executing on the customer's site. At the same time, the system ensures that the developer is receiving the proper amount of money for the generation of the software or content using the developer's software.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A system for controlling the execution or display of an asset on a customer's site, the asset being developed using a developer's software, the system comprising:

a customer site comprising one or more locations containing one or more assets, a master key purchased by the customer from the developer that specifies the one or more locations on the site of the customer where the software is located wherein the master key is stored at a particular location on the site of the customer, each asset containing a content key that identifies the location of the master key; and a user computer comprising means for determining if the execution or display of the asset downloaded from the customer's site is authorized by the developer, the determining means comprising means for downloading the asset from the customer's site, means for determining the location of the master key based on the content key in the asset, means for downloading the master key from the determined location on the customer's site and means for comparing the locations contained in the master key to the location of the asset to determine if the asset is accessible by the user computer.

2. The system of claim 1, wherein the location of each of the one or more assets comprises a Web page having a unique URL.

3. The system of claim 2, wherein the master key further comprises a customer identification number, a URL of the master key and a listing of the URL's of the Web pages authorized by the customer.

4. The system of claim 3, wherein the master key further comprises, for each URL, a time period during which the Web page is authorized to be displayed to the user.

5. The system of claim 3, wherein the user computer further comprises means for generating an error message if the asset is not authorized by the master key and means for generating a watermark covering the asset if the domain name is authorized, but the URL is not authorized.

6. The system of claim 1, wherein the locations of the one or more assets comprises a domain name.

7. The system of claim 1, wherein the master key and the content key are encrypted.

8. The system of claim 1, wherein the asset comprises a rich media asset containing information about an animated character.

9. The system of claim 1, wherein the customer site further comprises means for adding more URL's into the master key to authorize more locations.

10. The system of claim 1, wherein the customer site further comprises means for creating the asset comprising means for embedding the content key into the asset when the asset is created.

11. A device for controlling the execution or display of an asset downloaded from a customer's site, the asset being developed using a developer's software, the device comprising:

means for downloading the asset from a customer's site wherein the customer site comprises one or more locations containing one or more assets, a master key purchased by the customer from the developer that specifies the one or more locations on the site of the customer where the software is located wherein the master key is stored at a particular location on the site of the customer, each asset containing a content key that identifies the location of the master key;

means for determining if the execution or display of the asset downloaded from the customer's site is authorized by the developer, the determining means comprising means for determining the location of the master key based on the content key in the asset, means for downloading the master key from the determined location on the customer's site and means for comparing the locations contained in the master key to the location of the asset to determine if the asset is accessible by the user computer; and means for displaying the asset if the asset is authorized.

12. The device of claim 11, wherein the location of each of the one or more assets comprises a Web page having a unique URL.

13. The device of claim 12, wherein the master key further comprises a customer identification number, a URL of the master key and a listing of the URL's of the Web pages authorized by the customer.

14. The device of claim 13, wherein the master key further comprises, for each URL, a time period during which the Web page is authorized to be displayed to the user.

15. The device of claim 13 further comprising means for generating an error message if the asset is not authorized by the master key and means for generating a watermark covering the asset if the domain name is authorized, but the URL is not authorized.

16. The device of claim 11, wherein the locations of the one or more assets comprises a domain name.

17. The device of claim 11, wherein the master key and the content key are encrypted.

18. The device of claim 11, wherein the asset comprises a rich media asset containing information about an animated character.

19. The device of claim 11 further comprising means for adding more URL's into the master key to authorize more locations.

20. A method for controlling the execution or display of an asset on a customer's site, the asset being developed using a developer's software, the method comprising:

downloading an asset from a customer site comprising one or more locations containing one or more assets, a master key purchased by the customer from the developer that specifies the one or more locations on the site of the customer where the software is located wherein the master key is stored at a particular location on the site of the customer, each asset containing a content key that identifies the location of the master key;

determining if the execution or display of the asset downloaded from the customer's site is authorized by the developer, the determining comprising determining the location of the master key based on the content key in the asset, downloading the master key from the determined location on the customer's site and comparing the locations contained in the master key to the location of the asset to determine if the asset is accessible by the user computer.

21. The method of claim 20, wherein the location of each of the one or more assets comprises a Web page having a unique URL.

22. The method of claim 21, wherein the master key further comprises a customer identification number, a URL of the master key and a listing of the URL's of the Web pages authorized by the customer.

23. The method of claim 22, wherein the master key further comprises, for each URL, a time period during which the Web page is authorized to be displayed to the user.

24. The method of claim 22 further comprising generating an error message if the asset is not authorized by the master key and generating a watermark covering the asset if the domain name is authorized, but the URL is not authorized.

25. The method of claim 20, wherein the locations of the one or more assets comprises a domain name.

26. The method of claim 20, wherein the master key and the content key are encrypted.

27. The method of claim 20, wherein the asset comprises a rich media asset containing information about an animated character.

28. The method of claim 20 further comprising adding more URL's into the master key to authorize more locations.

29. The method of claim 20 further comprising creating the asset comprising embedding the content key into the asset when the asset is created.

* * * * *